(12) United States Patent
Zacharias et al.

(10) Patent No.: US 12,279,561 B2
(45) Date of Patent: Apr. 22, 2025

(54) HOPPER BOTTOM FOR SUPPORTING A CYLINDRICAL SIDE WALL OF A GRAIN BIN WITH DUCTING AND OPENINGS TO INTRODUCE AIR INTO THE GRAIN BIN

(71) Applicants: Francisco Zacharias, Wlnkler (CA); Alberto Zacharias, Winkler (CA); Adolfo Zacharias, Winkler (CA)

(72) Inventors: Francisco Zacharias, Wlnkler (CA); Alberto Zacharias, Winkler (CA); Adolfo Zacharias, Winkler (CA)

( * ) Notice: Subject to any disclaimer, the term of this patent is extended or adjusted under 35 U.S.C. 154(b) by 403 days.

(21) Appl. No.: 17/784,719

(22) PCT Filed: Dec. 7, 2020

(86) PCT No.: PCT/CA2020/051681
§ 371 (c)(1),
(2) Date: Jun. 13, 2022

(87) PCT Pub. No.: WO2021/113961
PCT Pub. Date: Jun. 17, 2021

(65) Prior Publication Data
US 2023/0015981 A1    Jan. 19, 2023

Related U.S. Application Data

(60) Provisional application No. 63/061,332, filed on Aug. 5, 2020, provisional application No. 62/946,663, filed on Dec. 11, 2019.

(51) Int. Cl.
*A01F 25/22* (2006.01)
*B65D 88/74* (2006.01)
(52) U.S. Cl.
CPC ............ *A01F 25/22* (2013.01); *B65D 88/745* (2013.01)

(58) Field of Classification Search
CPC .... B65D 88/28; B65D 88/741; B65D 88/742; B65D 88/744; B65D 88/745; Y02A 40/51; E04H 7/22; A01F 25/22
See application file for complete search history.

(56) References Cited

U.S. PATENT DOCUMENTS

| 640,791 | A | * | 1/1900 | Morris | ................. | B65D 88/742 |
| | | | | | | 34/174 |
| 1,929,084 | A | * | 10/1933 | Strub | ................... | B65D 88/742 |
| | | | | | | 34/174 |

(Continued)

FOREIGN PATENT DOCUMENTS

CN        104996106 A  * 10/2015

OTHER PUBLICATIONS

Wan et al, CN104996106 and translation (Year: 2015).*

*Primary Examiner* — Steven S Anderson, II
(74) *Attorney, Agent, or Firm* — Ryan W. Dupuis; Michael R. Williams; Ade & Company Inc

(57) ABSTRACT

A hopper bottom for supporting a cylindrical side wall of a grain bin thereon comprises an outer wall arranged to be supported on a support surface and an inclined inner wall supported in spaced relation vertically above the outer wall, which has an inverted cone shape. A manifold or ducting is provided between the outer and inner walls for guiding air received from a blower between the outer and inner walls. Ventilation openings are provided across a full radius of the inner wall so that the air from the manifold is released upwardly to ventilate material received vertically above the hopper bottom. The manifold or ducting also is in fluidic communication with a discharge chute formed between openings in the inner and outer walls, through which the material passes on exit from the hopper bottom, to emit the air in an inward and downward direction to assist the gravity discharge.

14 Claims, 5 Drawing Sheets

(56) References Cited

U.S. PATENT DOCUMENTS

| | | | | |
|---|---|---|---|---|
| 2004/0055470 A1* | 3/2004 | Strauser | ................ | B01D 50/20 |
| | | | | 96/417 |
| 2011/0014020 A1* | 1/2011 | Thiessen | ................ | B65G 65/46 |
| | | | | 414/326 |
| 2013/0295833 A1* | 11/2013 | Thiessen | ................ | B65D 88/28 |
| | | | | 454/178 |
| 2014/0378044 A1* | 12/2014 | Thiessen | ............. | B65D 88/742 |
| | | | | 454/181 |
| 2016/0376096 A1* | 12/2016 | Thiessen | ............. | B65D 88/742 |
| | | | | 454/180 |
| 2020/0031571 A1* | 1/2020 | Rosumowitsch | ...... | B65D 88/72 |

* cited by examiner

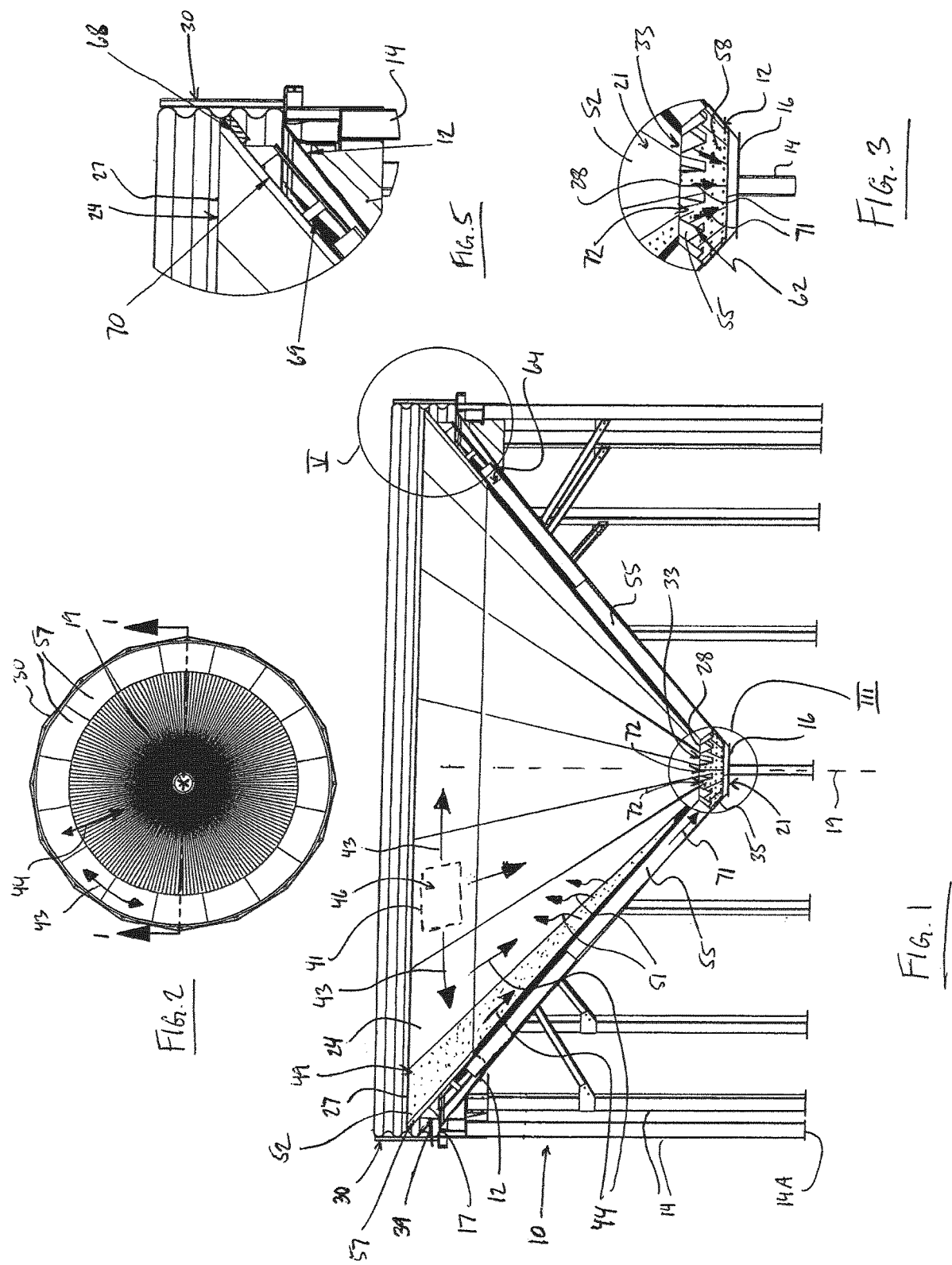

HOPPER BOTTOM FOR SUPPORTING A CYLINDRICAL SIDE WALL OF A GRAIN BIN WITH DUCTING AND OPENINGS TO INTRODUCE AIR INTO THE GRAIN BIN

This application is a national phase filing of PCT/CA2020/051681 and claims priority from U.S. Provisional Application Ser. No. 62/946,663 filed Dec. 11, 2019 and U.S. Provisional Application Ser. No. 63/061,332 filed Aug. 5, 2020.

FIELD OF THE INVENTION

The present invention relates to a hopper bottom for supporting a cylindrical side wall of a grain bin that has ducting and openings to introduce air into the grain bin, and more particularly to such a hopper bottom in which the ducting is formed between an inner inclined wall above which the particulate material is stored and an outer wall which is arranged to be supported on a support surface.

BACKGROUND

There exist several arrangements of hopper bottom of a grain bin with ducting particularly for the purpose of ventilating the particulate material which is stored in the grain bin. It is desirable to provide a novel design of hopper bottom which may be more effective at ventilating as much of the stored particulate material as possible while also ducting the air to fulfil other advantageous purposes.

SUMMARY OF THE INVENTION

According to an aspect of the invention there is provided a hopper bottom for supporting a cylindrical side wall of a grain bin thereon comprising:

an inclined outer wall arranged to be supported on a support surface, the inclined outer wall having an inverted cone shape so as to taper downwardly and inwardly from a top end to a bottom end of the inclined outer wall;

an inclined inner wall supported in spaced relation vertically above the inclined outer wall, the inclined inner wall having an inverted cone shape so as to taper downwardly and inwardly from a top end to a bottom end of the inclined inner wall;

the top end of the inclined inner wall or the inclined outer wall being arranged to receive the cylindrical side wall of the grain bin;

the inclined outer and inner walls being coaxial so as to enclose a common upstanding axis;

the top ends of the outer and inner inclined walls being located at a substantially common radial distance from the common upstanding axis such that the inclined inner wall at least covers an upper portion of the inclined outer wall from the top end of the inclined outer wall towards the bottom end thereof;

a manifold formed between the inclined outer and inner walls that is arranged for fluidic communication with a blower so as to receive ventilation air from the blower for release into an interior of the grain bin;

the manifold being arranged to distribute the ventilation air in a circumferential direction relative to the common upstanding axis;

the manifold spanning a full radius of the inclined inner wall so as to distribute the ventilation air in a radial direction relative to the common upstanding axis; and a plurality of ventilation openings defined in the inclined inner wall so as to communicate the manifold with the interior of the grain bin to release the ventilation air upwardly into the interior of the grain bin;

the ventilation openings being provided substantially across the full radius of the inclined inner wall from the top end to the bottom end thereof such that particulate material stored in the grain bin vertically above the inclined inner wall is ventilated by the ventilation air.

Preferably, the ventilation openings are provided substantially across the full circumference of the inclined inner wall.

In one arrangement, the inclined inner wall spans substantially a full radius of the inclined outer wall.

In one such arrangement, the bottom end of the inclined outer wall defines a central discharge opening for gravity discharge of the particulate material stored in the grain bin and the manifold is open below the bottom end of the inclined inner wall in the vicinity of the central discharge opening such that the ventilation air is released in a radially-inward and downward direction towards the central discharge opening.

Preferably, there are provided openings in communication with the manifold around a full periphery of the central discharge opening of the inclined outer wall. In other words, preferably, the manifold is open substantially about a full periphery of the central discharge opening of the inclined outer wall.

In one arrangement, when the bottom end of the inclined outer wall defines a central discharge opening for gravity discharge of the particulate material stored in the grain bin, the bottom end of the inclined inner wall is recessed radially outwardly from the common upstanding axis relative to the bottom end of the inclined outer wall so as to form between the bottom ends of the inclined inner and outer walls a discharge chute which has an inverted cone shape between an upper end of the discharge chute defined by the bottom end of the inclined inner wall and a lower end of the discharge chute defined by the bottom end of the inclined outer wall.

In one arrangement, in addition to spanning the full radius of the inclined inner wall, the manifold extends in a circumferential direction of the inclined inner wall in order to distribute the ventilation air in said circumferential direction, and there is provided a plurality of substantially-radially extending support members disposed in the manifold and arranged to support the inclined inner wall in spaced relation to the inclined outer wall, the support members bridging between the inclined inner and outer walls and extending from the bottom end of the inclined inner wall towards the top end thereof so as to form ducts within the manifold for distributing the ventilation air in the radial direction.

In one such arrangement, the manifold spans a full circumference of the inclined inner wall and the support members extend from lower ends which are coincident with the bottom end of the inclined inner wall relative to a radial direction thereof to upper ends of the support members which are spaced from the top end of the inclined inner wall such that the manifold comprises an annular upper portion adjacent the top end of the inclined inner wall and a plurality of the ducts in communication with the annular upper portion.

In another arrangement, the manifold extends in the circumferential direction in a closed loop path encompassing the upstanding axis and the support members extend from upper ends which are coincident with the top end of the inclined inner wall relative to a radial direction thereof to lower ends of the support members located at or adjacent the bottom end of the inclined inner wall so as to locate the closed loop path adjacent the bottom end of the inclined inner wall and to form a plurality of the ducts in communication with the closed loop path.

In one such arrangement, the lower ends of a first subset of the support members are spaced from the bottom end of the inclined inner wall and the lower ends of a second subset of the support members are coincident with the bottom end of the inclined inner wall, and wherein the second subset of the support members define circulation openings located along the closed annular path of the manifold which are arranged to permit the ventilation air to pass therethrough in the circumferential direction.

In at least one such arrangement, the hopper bottom further includes a plurality of substantially-radially extending auxiliary support members each disposed intermediate respective ones of an adjacent pair of the support members relative to the circumferential direction, wherein upper ends of the auxiliary support members are located at or adjacent the top end of the inclined inner wall and lower ends of the auxiliary support members are spaced radially outwardly from the lower ends of adjacent ones of the support members.

In at least one such arrangement, the hopper bottom further includes, along each duct, a plurality of cross members each spanning generally in the circumferential direction between respective ones of an adjacent pair of the support members at radially spaced positions from each other and arranged to support the inclined inner wall in spaced relation to the inclined outer wall, the cross members defining with the inclined outer wall airflow control openings which are sized to modulate flow of the ventilation air in the radial direction along the ducts so that the ventilation air flows along substantially the full length of each duct.

Preferably, in each of the ducts without an inlet opening for communicating with the blower located externally of the manifold, the airflow control openings collectively defined by the cross members and the inclined outer wall are sized progressively smaller, with respect to a height direction between the inclined outer wall and bottom edges of the cross members extending generally in the circumferential direction and disposed in opposite spaced relation to the inclined outer wall, in a radially outward direction along the duct.

In at least one arrangement, in each duct having an inlet opening for communicating with the blower located externally of the manifold, the airflow control openings collectively defined by the cross members and the inclined outer wall are sized progressively smaller, with respect to the height direction, in the radially outward direction along a respective one of the ducts.

In at least one arrangement, each cross member is in the form of an arch having a pair of generally parallel upstanding legs coupled to the inclined outer wall and a generally horizontally extending portion bridging therebetween, the legs of all of the cross members being of a substantially common width between outer sides of the legs connected to adjacent ones of the support members and inner sides each defining a respective one of the airflow control openings.

Preferably, when the manifold extends in the circumferential direction in a closed loop path encompassing the upstanding axis to distribute the ventilation air in said circumferential direction, the manifold comprises a single inlet opening which is coincident with the closed loop path for communicating the manifold with the blower located externally thereof.

As such, preferably, when the manifold comprises the annular upper portion, the single inlet opening is formed closer to the top end of the inclined outer wall than to the bottom end thereof.

Thus, preferably, when the manifold alternatively comprises an annular lower portion in which the closed loop path is adjacent the bottom end of the inclined inner wall, the single inlet opening is formed closer to the bottom end of the inclined outer wall than to the top end thereof.

According to another aspect of the invention there is provided a hopper bottom for supporting a cylindrical side wall of a grain bin thereon comprising:

an outer wall arranged to be supported on a support surface, the outer wall defining a discharge opening for permitting passage of particulate material stored in the grain bin to an outside thereof;

an inclined inner wall supported in spaced relation vertically above the outer wall, the inclined inner wall having an inverted cone shape so as to taper downwardly and inwardly from a top end to a bottom end of the inclined inner wall;

the top end of the inclined inner wall or the inclined outer wall being arranged to receive the cylindrical side wall of the grain bin;

the bottom end of the inclined inner wall defining an opening that is in communication with the discharge opening of the outer wall so as to form therewith a discharge chute for gravity discharge of the particulate material stored in the grain bin, an upper end of the discharge chute being defined by the bottom end of the inclined inner wall and a lower end of the discharge chute being defined by the discharge opening of the outer wall;

ducting formed between the outer wall and the inclined inner wall that is arranged for fluidic communication with a blower for guiding air received therefrom between the outer wall and the inclined inner wall;

the ducting being in communication with the discharge chute at a location between the upper and lower ends thereof and being arranged to emit the air from the blower downwardly and inwardly so as to aid the gravity discharge of the particulate material through the discharge chute.

Preferably, the inclined inner wall includes a plurality of openings which are in communication with the ducting such that the air from the blower is also released upwardly into an interior of the grain bin.

Preferably, the discharge chute has an inverted cone shape so as to taper downwardly and inwardly from the upper end thereof to the lower end of the discharge chute.

Preferably, the ducting is provided substantially around the full circumference of the inclined inner wall such that the air is emitted substantially about the full periphery of the discharge chute.

BRIEF DESCRIPTION OF THE DRAWINGS

The invention will now be described in conjunction with the accompanying drawings in which:

FIG. 1 is a cross-sectional view of an arrangement of hopper bottom according to the present invention, which is taken along line 1-1 in FIG. 2;

FIG. 2 is a top plan view of the arrangement of FIG. 1;

FIG. 3 is an enlarged view of the area indicated at III in FIG. 1;

FIG. 5 is an enlarged view of the area indicated at V in FIG. 1;

In the drawings like characters of reference indicate corresponding parts in the different figures.

DETAILED DESCRIPTION

Figure 4:
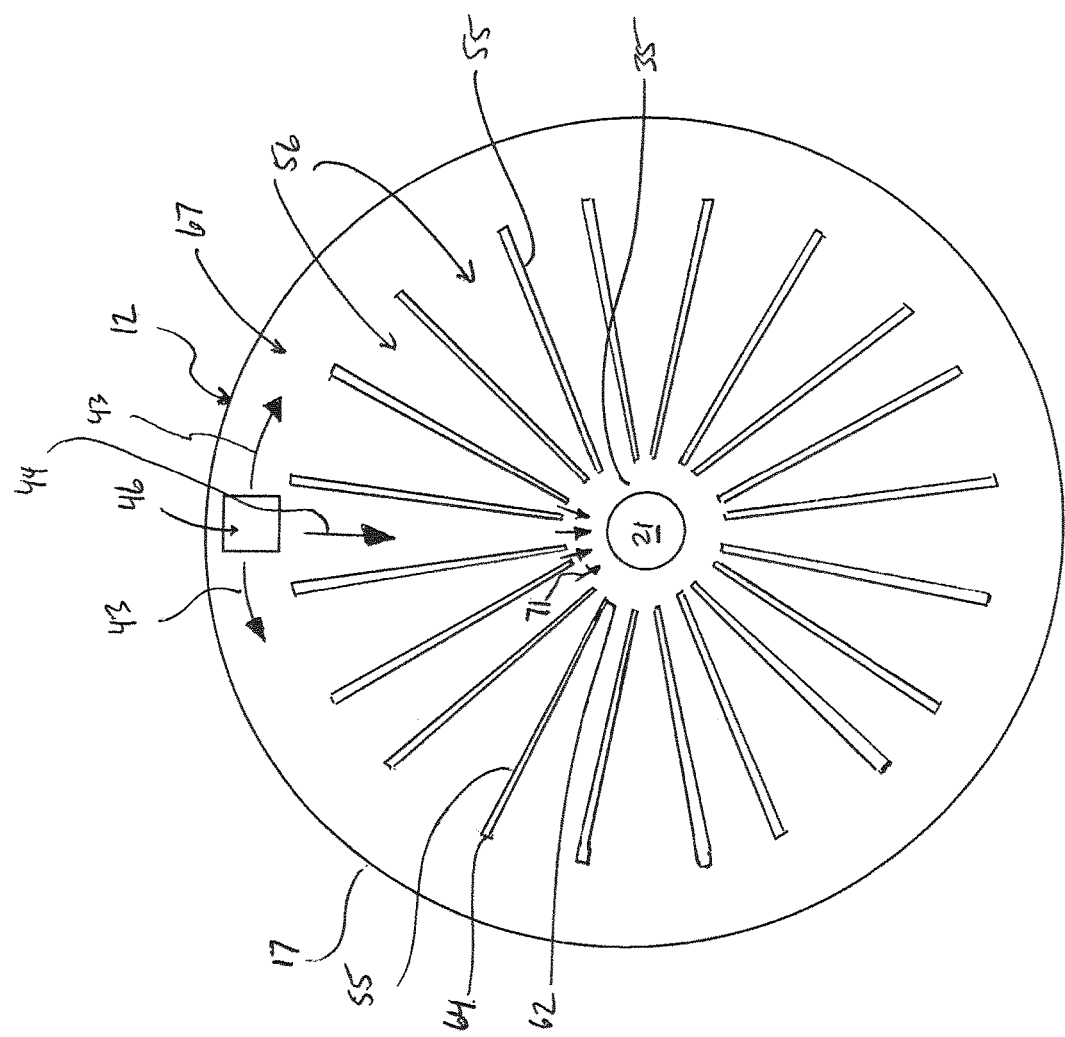
FIG. 4 is a schematic top plan view of ducting of the arrangement of FIG. 1, with an inner wall removed.

The accompanying figures show arrangements of hopper bottom indicated at 10 and 10' for supporting a cylindrical side wall of a grain bin (not shown) thereon.

The hopper bottom comprises an outer wall 12 which is arranged to be supported on a support surface, for example by having connected thereto a plurality of upstanding legs 14 at spaced locations thereon, such that bottoms 14A of the legs are adapted for resting on the support surface directly or for connecting to a footing which is adapted for resting on the support surface that interconnects multiples legs so that they are held in fixed relation to one another. Typically, when the hopper bottom includes the legs 14, a bottom 16 of the outer wall 12 is held at a spaced height above the support surface.

The outer wall 12 is inclined and has an inverted cone shape so as to taper downwardly and inwardly from a top end 17 to a bottom end defining the bottom 16 of the inclined outer wall. The conical inclined outer wall 12 encloses an upstanding axis 19 about which the outer wall is symmetrically shaped.

The outer wall 12 defines a discharge opening 21 for permitting passage of particulate material stored in the grain bin to an outside thereof. More specifically, it is the bottom end 16 of the inclined outer wall 12 that defines the discharge opening 21, which is centrally located of the outer wall 12, for gravity discharge of the particulate material stored in the grain bin.

The hopper bottom further includes an inclined inner wall 24 which is supported in spaced relation vertically above the outer wall 12. Similarly to the outer wall 12, the inclined inner wall 24 has an inverted cone shape so as to taper downwardly and inwardly from a top end 27 to a bottom end 28 of the inclined inner wall. Furthermore, also like the outer wall 12, the conical inclined inner wall 24 encloses an upstanding axis about which the inner wall is symmetrically shaped, which is a common axis as that of the outer wall that is indicated at 19. Thus, the inclined outer and inner walls 12, 24 are coaxial so as to enclose a common upstanding axis 19.

The top end 17 or 27 of either the inclined outer or inner wall 12, 24 is arranged to receive the cylindrical side wall of the grain bin. In the first illustrated arrangement, this is achieved by providing a cylindrical collar 30 surrounding the top end 27 of the inner wall 24 which protrudes above the inner wall's top end 27 so as to provide a circumferentially extending retaining rim or flange on an outside thereof. As the cylindrical side wall of the grain bin typically is sized substantially equal to a diameter of an inclined wall of the hopper bottom directly above which the particulate material is stored, which in the illustrated arrangement is defined by the inner wall 24, the bin side wall can be carried on the inner wall 24 and retained in location thereon by the collar 30. In the first illustrated arrangement, the collar 30 is a two-piece collar comprising an outer stiffener portion and an inner corrugated portion for substantially matingly sealing with a corrugated side wall of a grain bin.

Figure 6:
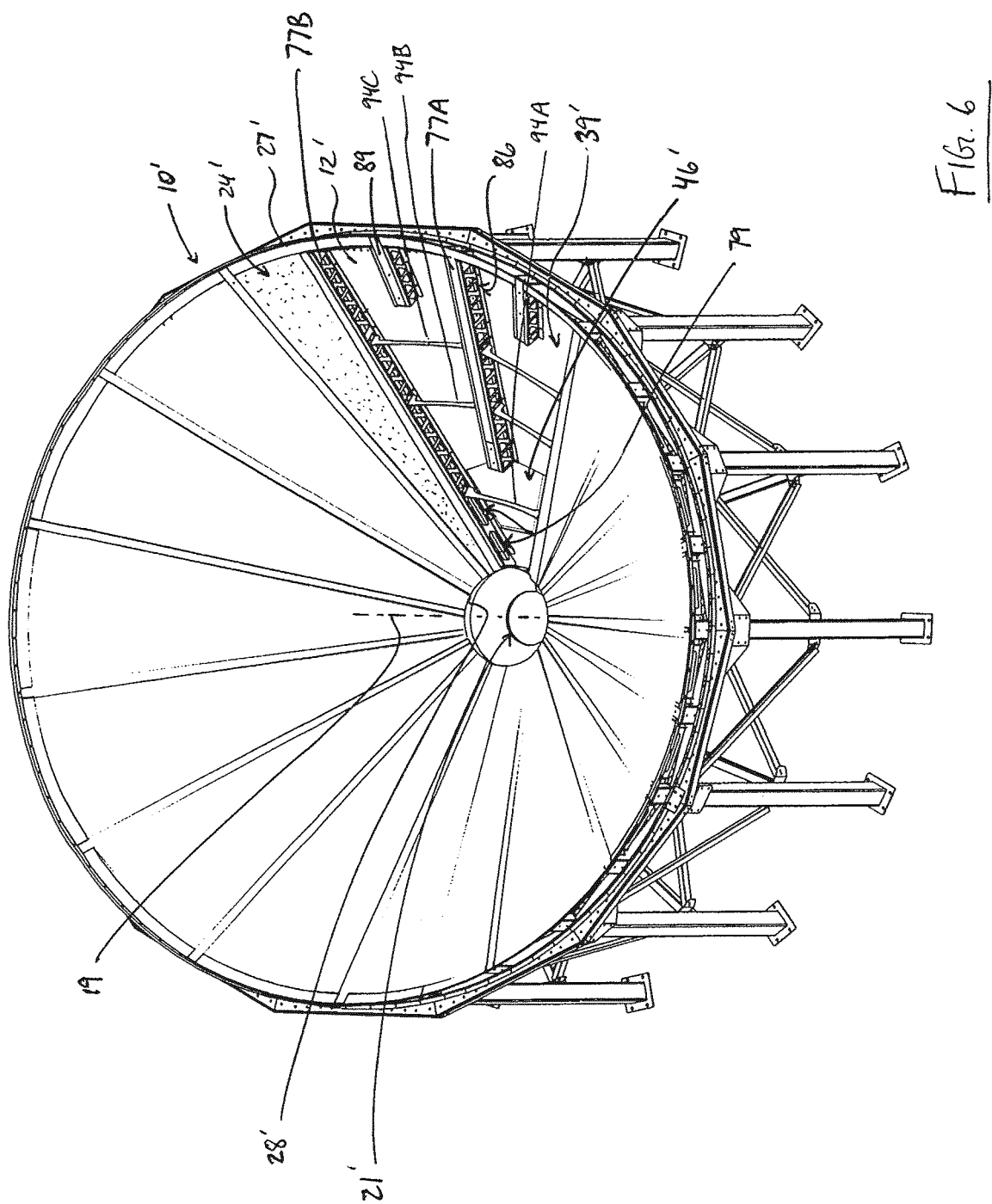
FIG. 6 is a perspective view of another arrangement of hopper bottom with different ducting, where a portion of an inner wall of the hopper bottom is removed to show this ducting.
Figure 7:
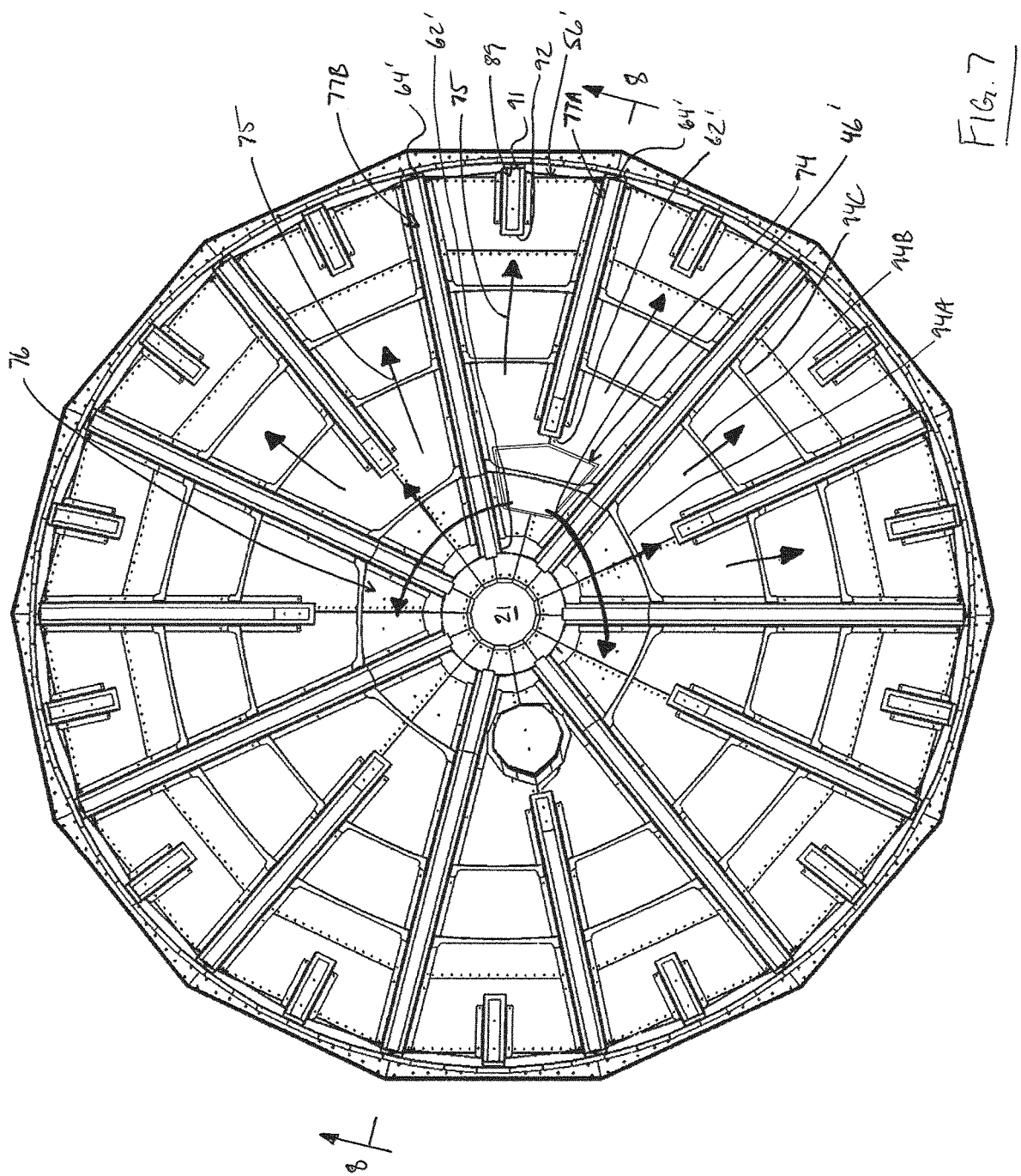
FIG. 7 is a top plan view of the arrangement of FIG. 6 with the inner wall removed to show the ducting.
Figure 8:
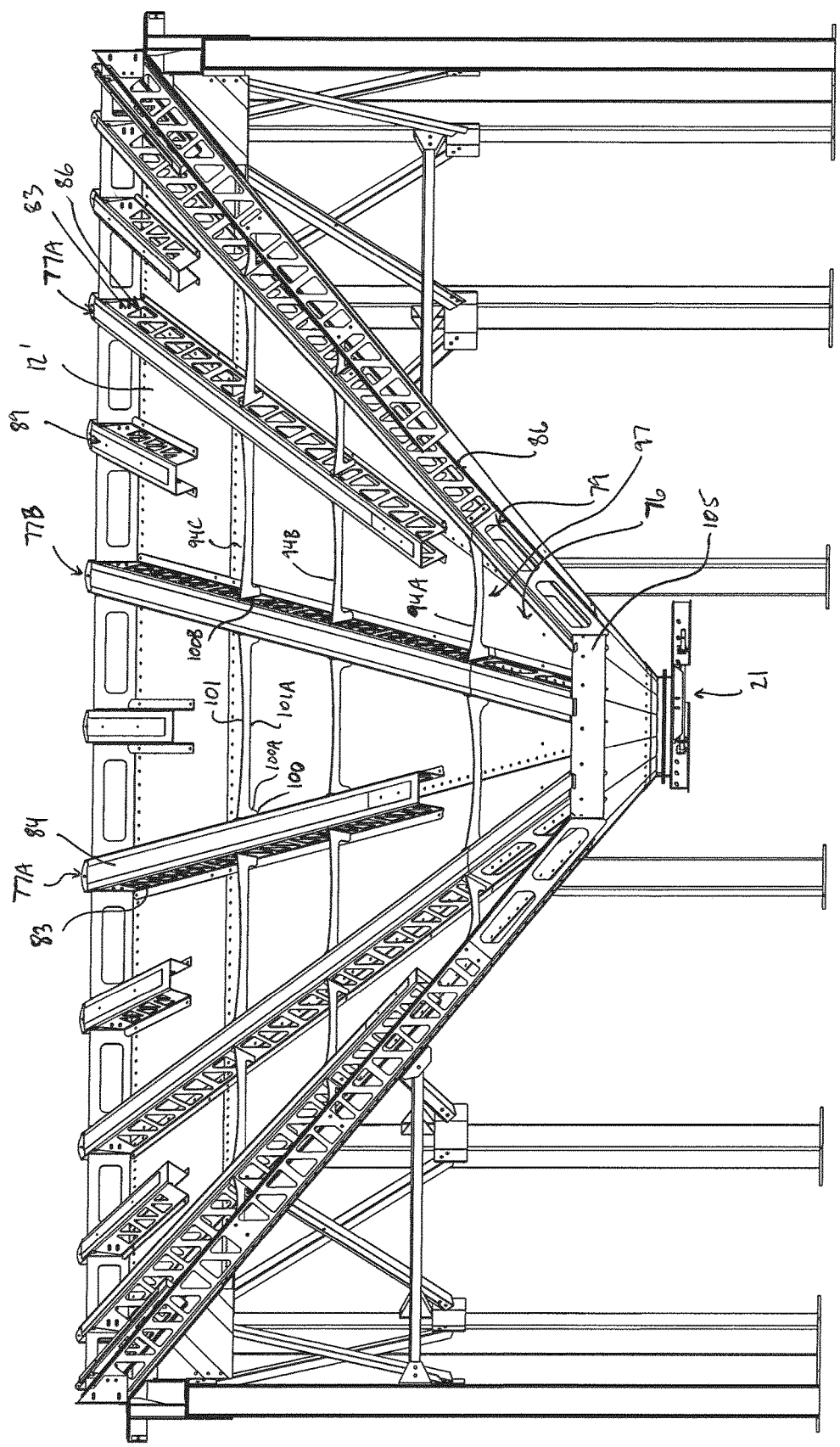
FIG. 8 is a cross-sectional view along line 8-8 in FIG. 7.

In the second arrangement of FIGS. 6-8, it is the top end 17' of the outer inclined wall 12' which is arranged to receive the cylindrical side wall of the grain bin by including an outwardly extending generally horizontal ledge 31 on which the side wall can be rested to encompass the top end 27' of the inner wall 24'. The cylindrical side wall which is sized slightly larger in diameter than the inner wall's top end 27' so as to be substantially equal thereto can then be fastened in fixed position to the hopper bottom at support members or brackets which carry the inner wall 24' in spaced relation to the outer wall 12'.

In order to permit the particulate material to exit the grain bin, the bottom end 28 of the inclined inner wall 24 defines an opening 33 that is in communication with the discharge opening 21 of the outer wall 12, such that the inner wall 24 also has a central discharge opening. Thus, there is formed by the coincident openings 21 and 33 (coincident with respect to location, relative to a radial direction of the hopper bottom) a discharge chute for gravity discharge of the particulate material stored in the grain bin, in which an upper end of the discharge chute is defined by the bottom end 28 of the inclined inner wall 24 and a lower end of the discharge chute is defined by the discharge opening 21 of the outer wall 12.

As the cylindrical side wall of the grain bin is supported on the inclined inner wall 24, such that the inclined inner wall 24 is presented for direct exposure and contact with the particulate material to be stored, the top ends of the outer and inner inclined walls indicated at 17 and 27 respectively are located at a substantially common radial distance from the common upstanding axis 19, such that the inclined inner wall 24 at least covers an upper portion of the inclined outer wall 12 spanning from the top end 17 of the inclined outer wall 12 towards the bottom end thereof. In the illustrated arrangement, the inclined inner wall 24 spans substantially a full radius of the inclined outer wall between the top and bottom ends 17, 16 thereof. More specifically, in the illustrated arrangement the bottom end 28 of the inclined inner wall 24 is recessed radially outwardly from the common upstanding axis 19 relative to the bottom end 16 of the inclined outer wall 12 such that the discharge chute formed between the bottom ends of the inclined inner and outer walls has an inverted cone shape between its upper and lower ends, so as to taper downwardly and inwardly in overall shape. Thus, the inclined inner wall 24 basically covers all of the outer wall 12 with the exception of an inner end portion 35 thereof surrounding the central discharge opening 21. In other arrangements which are not shown, the bottom end 28 of the inclined inner wall 24 is disposed at an intermediary location between the top and bottom ends 17, 16 of the outer wall 12 but generally located closer to the bottom end 16 than to the top end 17 along a radial direction of the outer wall 12, such that the inner wall 24 covers a majority of the outer wall 12 leaving a lower portion thereof, larger than that indicated at 35 in the illustrated arrangement, exposed for contact with the stored particulate material. This allows an inclined hopper wall collectively formed by the inner and outer walls 24, 12 to maintain a generally inverted conical shape that is only downwardly inclined from its upper end to its lower end so that the stored particulate material can be discharged by gravity over a full diameter of the hopper bottom. The inner end portion 35 of the inclined outer wall is substantially smooth so that material which comes in contact with same is enabled to discharge by gravity through the central discharge opening 21.

In order to ventilate the stored particulate material such as grain so as to avoid spoilage thereof, the hopper bottom includes a manifold 39 formed between the inclined outer and inner walls 12, 24 that is arranged for fluidic communication with a blower 41 (schematically shown, in stippled line, but only in relation to the first arrangement for convenience of illustration) so as to receive an airflow from, and generated by, the blower 41 for release into an interior of the grain bin above the hopper bottom 10. The manifold 39 is arranged to distribute the airflow in a circumferential direction 43 relative to the common upstanding axis 19 and in a radial direction 44 relative thereto. In other words, the manifold 39 defines ducting formed between the outer and inner walls 12, 24 arranged for fluidic communication with the blower 41 for guiding air received therefrom between the outer and inner walls 12, 24.

In both illustrated arrangements, the manifold 39 spans a full radius of the inclined inner wall 24 so as to distribute the blower air generally in the radial direction 44, and also extends in a closed loop path encompassing the upstanding axis and adjacent the top end of the inner wall 24 so as to span a full circumference of the inner wall 24 so as to distribute the blower air generally in the circumferential direction 43. Thus, in both illustrated arrangements there is provided a common manifold 39 under substantially a whole of the inner wall 24, and the manifold 39 comprises a single inlet opening 46 (shown in stippled line in FIG. 1) communicating with a single blower 41 located externally of the manifold.

In order to release the ventilation air supplied to the manifold 39 into the interior of the grain bin, a plurality of ventilation openings 49 (schematically shown as dots on only a portion of the inclined inner wall 24) are defined in the inclined inner wall 24 so as to communicate the manifold 39 with the interior of the grain bin to release the ventilation air upwardly into same, as shown by arrows 51. The ventilation openings 49 are provided substantially across the full radius of the inclined inner wall 24 from the top end 27 to the bottom end 28 thereof such that the particulate material stored in the grain bin vertically above the inclined inner wall across the full radius thereof is ventilated by the ventilation air. So as to ensure that substantially all of the particulate material stored vertically above the inclined inner wall 24 receives ventilation air, the ventilation openings 49 are provided substantially across the full circumference of the inclined inner wall 24, though it will be appreciated that for clarity of illustration the openings 49 are shown only a portion of the inner wall 24. Thus, the inclined inner wall 24 provides a substantially smooth concave inclined interior surface 52 to enable gravity discharge of the stored material that is perforated so that the airflow supplied to the manifold can be released into the bin interior as indicated at 51.

With reference to FIG. 4, to guide the blower airflow for distribution across substantially a full interior surface area of the inner wall 24 as defined by perforated surface 52, as the manifold 39 extends in the circumferential direction 43 in order to distribute the airflow circumferentially of the inner wall, the hopper bottom 10 includes a plurality of substantially-radially extending support members 55 which are disposed in the manifold 39 at circumferentially spaced locations and are arranged to support the inclined inner wall 24 in spaced relation to the inclined outer wall 12. The radial support members 55 bridge between the inclined inner and outer walls 24, 12, which collectively define the manifold 39 therebetween, so as to span a full height of the manifold, and they extend from the bottom end 28 of the inclined inner wall 24 towards the top end 27 thereof so as to form ducts 56 within the manifold 39 between each circumferentially adjacent pair of the support members 55 for distributing the ventilation air in the radial direction 44. In both illustrated arrangements, the hopper bottom 10 is constructed by assembly of a kit of parts, including a plurality of concavely curved generally trapezoidal sheets which define the inner and outer walls. In the first arrangement 10 the support members 55 are formed by flanges, one of which is connected on one of an opposite pair of radially-extending sides of each perforated sheet 57 forming the inner wall 24 so as to form a foot for resting on an inner surface 58 of the outer wall. At an opposite side to the flange-footing, each perforated sheet 57 is connected to a circumferentially adjacent sheet at the side where its flange 55 is located. The flanges 55 are formed integrally with the perforated sheets 57. Thus, each of the ducts formed by the radial support members 55 lies beneath one of the perforated sheets 57.

As the manifold 39 spans the full circumference of the inclined inner wall 24 such that a common manifold is provided substantially under the whole of the inner wall, the radial support members 55 extend from lower ends 62 thereof which are coincident with the bottom end 28 of the inclined inner wall relative to a radial direction thereof to upper ends 64 of the support members (hidden from view in FIG. 1 and therefore are shown in stippled line therein) which are spaced from the top end 27 of the inclined inner wall 24 such that the manifold comprises an annular upper portion 67 adjacent the top end 27 of the inclined inner wall, which spans the full circumference of the inclined inner wall 24, and a plurality of the ducts 56 in communication with the annular upper portion 67 on an inner side thereof and extending radially inwardly therefrom towards the discharge chute. As such, the single inlet opening 46 of the manifold communicating with the external blower 41 is located closer to the top end 17 than to the bottom end 16 thereof so as to be in communication with the annular portion 67, and more specifically the inlet opening 46 is coincident with the annular portion 67. In both illustrated arrangements, the blower 41 is communicated with the manifold 39 through the outer wall 12. The blower 41 is arranged to pressurize the manifold 39 sufficiently so as to provide an airflow for release over the full interior surface area of the inner wall 24 and for release at the discharge chute, as will be appreciated shortly.

In order to provide the fluidically uninterrupted upper portion 67 of the manifold 39, the top end 27 of the inclined inner wall is supported on a ledge 68 protruding inwardly from the collar 30. Furthermore, as more clearly shown in FIG. 5, the perforated sheets 57 include substantially-radially extending braces 69 which generally are in alignment with the flanges 55, but which define substantial openings 70 through which the air can pass so as to circulate around the manifold in the circumferential direction 43.

Since the manifold 39 extends to the bottom end 28 of the inclined inner wall such that the airflow is available in the vicinity of the discharge chute, the manifold 39 is open below the bottom end 28 of the inclined inner wall 24 in the vicinity of the central discharge opening 21 of the outer wall such that the ventilation air is released in a radially-inward and downward direction towards the central discharge opening 21, as indicated by arrows 71. That is, the ducting under the inclined inner wall 24, that is formed between the outer and inner walls, is in communication with the discharge chute at a location between the upper and lower ends thereof and is arranged to emit the air from the blower 41 downwardly and inwardly so as to aid the gravity discharge of the particulate material through the discharge chute.

Furthermore, since the manifold 39 extends in the circumferential direction 43 such that the airflow is available at various circumferential locations around the central discharge opening 21 of the outer wall 12, the hopper bottom 10 includes openings 72 in communication with the manifold 39 around a full periphery of the outer wall's central discharge opening 21. In other words, the manifold 39 is open substantially about the full periphery of the central discharge opening of the inclined outer wall. Thus, the air for assisting the gravity discharge of the stored material is emitted substantially about the full periphery of the discharge chute. This keeps the material flowing downwardly and centrally through the outer wall's discharge opening 21 while providing an extra downward push to urge the material more quickly out of the hopper bottom. In the first illustrated arrangement, the openings 72 each are collectively defined by the bottom end 28 of the inclined inner wall 24, the lower ends 62 of the circumferentially adjacent radial support members 55, and an upper surface of the outer wall 12.

In use, particulate material such as grain is stored in the grain bin formed by assembly of the cylindrical side wall (not shown) on the hopper bottom 10 with a top wall (not shown) closing an open top of the side wall opposite to the hopper bottom. With the particulate material received in the bin, the hopper bottom 10 is substantially covered thereby such that interior surfaces of the hopper bottom including that indicated at 52 of the inclined inner wall 24 and that of the exposed inner end portion 35 of the inclined outer wall 12 are in contact with the stored material.

The blower 41 is operated so as to introduce an airflow through the inlet opening 46 to the common manifold 39. The upper annular portion 67 of the manifold distributes the airflow circumferentially of the hopper bottom in the direction indicated by arrows 43, which airflow also travels through the ducts 56 in the radially inward direction of the hopper bottom. As the airflow flows through the manifold 39, it is released upwardly into the interior of the grain bin through the ventilation openings 49 which are distributed substantially over the whole surface area of the inner wall 24, so as to ventilate the stored material. The stored material that is located in the discharge chute and vertically above same, so as not to be disposed vertically above any portion of the inclined inner wall 24, is ventilated by the airflow indicated generally by arrow 71 that is released through the openings 72 in fluidic communication with the discharge chute.

When it is desired to remove the material from the grain bin, a discharge gate (not shown) which is supported beneath the discharge opening 21 of the outer wall is movable relative thereto between a closed position in which the gate is covering the opening 21, such that the material is retained in the grain bin, to an open position in which the discharge opening 21 is substantially unobstructed to permit the material to flow out of the bin by gravity. The blower 41 is also operable during discharge of the material so as to provide the airflow emitted from the openings 72 into the discharge chute, which acts to urge the material more quickly out of the bin than by gravity discharge alone. In other words, the airflow emitted into the discharge chute may increase the discharge rate of material stored above the hopper bottom by the bin formed thereby. Furthermore, the openings 72 provide a path for material or dust collecting in the manifold 39 to flow out thereof and, furthermore, out of the hopper bottom 10. Moreover, the airflow flowing in the direction of arrow 71 may act to carry this debris out of the manifold 39.

In another arrangement indicated at 10' that is shown in FIGS. 6 to 8, the hopper bottom 10' comprises a manifold 39' with different ducting arranged to convey the ventilation air from at least one inlet opening 46' in communication with the blower and located outwardly of a central discharge opening 21' of the hopper bottom 10', but closer thereto than to top ends 17', 27' of hopper walls 12', 24', and in a circumferential direction 74 for radially outward conveyance in direction 45 along a plurality of radially extending manifold ducts 56'.

In this second arrangement 10' the manifold 39', similarly to the manifold 39, extends in the circumferential direction of the hopper bottom in a closed loop path 76 encompassing the upstanding axis 19 in order to provide circumferential circulation of the ventilation air. However, in contrast to the first arrangement 10, in the second arrangement 10' substantially radially extending support members 77A and 77B of the hopper bottom 10' extend from upper ends 64' which are coincident with a top end 27' of an inclined inner wall 24' relative to the radial direction thereof 75 to lower ends 62' of the support members 77A, 77B located at or adjacent a bottom end 28' of the inclined inner wall so as to locate the closed loop path 76 adjacent the bottom end 28' of the inclined inner wall, instead of adjacent the top end 27 as in the first arrangement as shown more clearly in FIG. 4. Thus the manifold 39' spans a circumference of at least a size of the central discharge opening 21', and preferably that of a circular path larger than same as the lower ends 62' are spaced radially outwardly from the discharge opening 21'. Furthermore, as in the earlier arrangement, this configuration of support members 77A, 77B also forms a plurality of ducts 56' in communication with the closed loop path 76, where each duct is substantially defined between adjacent support members 77A, 77B. In the second arrangement 10' the support member 77A, 77B are distinct from perforated sheets forming the inner wall 24'.

In the illustrated second arrangement 10", the lower ends 62' of a first subset of the support members, which are those indicated 77A, are spaced from the bottom end 28' of the inclined inner wall 24' and the lower ends 62' of a second subset of the support members, that is those indicated at 77B, which are longer than those of the first subset are coincident with the inclined inner wall's bottom end 28'. As each support member of the second subset 77B spans a full radius of the inclined inner wall 24' between the top and bottom ends 27', 28', the members 77A, 77B of the second subset 77B define circulation openings 79 located along or coincident with the closed annular path 76 of the manifold 39', which are arranged to permit the ventilation air to pass therethrough in the circumferential direction 43. Individual members of the first and second subsets 77A, 77B are arranged in alternating fashion at uniformly angularly spaced positions around the axis 19 of the hopper bottom. This may provide adequate structural support for the inclined inner wall 24' in the radial direction 75 of the hopper bottom and in the vicinity of the central discharge opening 21' where typically more material is stored vertically thereabove, so as to provide a larger load, while facilitating circumferential circulation of the ventilation air.

It will be appreciated that, in the second illustrated arrangement 10", the support members 77A, 77B are in the form of channels with a pair of side walls 83 standing upwardly from an inclined outer wall 12' of the hopper bottom 10' and a base wall 84 spanning between the side walls 84 and connected to the inclined inner wall 24'. Thus the channels are generally inverted U-shaped. The side walls 83 of the members 77A, 77B are perforated as shown at 86 but in a manner arranged to substantially restrict the air to be conveyed along any one of the ducts 56'. Thus the circulation openings 79. The perforations 86 are each sized less than half of the size of an individual circulation opening 79, and in the illustrated arrangement they are triangular in shape acting primarily to reduce a mass of the respective support member 77A, 77B.

Furthermore, each circulation opening 79 comprises a pair of opposite, registered openings or apertures defined in the channel side walls 84 so that the ventilation air is enabled to flow through the respective support member 77A, 77B in a direction which is transverse to a direction of elongation of the member 77A, 77B.

For additional structural reinforcement the hopper bottom 10" further includes a plurality of substantially-radially extending auxiliary support members 89 each disposed intermediate respective ones of an adjacent pair of the support members 77A, 77B relative to the circumferential direction 74, regardless of subset 77A or 77B. Upper ends 91 of the auxiliary support members 89 are located at or adjacent the top end 27' of the inclined inner wall 24' and lower ends 92 of these members are spaced radially outwardly from the lower ends 62' of adjacent ones of the support members 77A, 77B. Thus the auxiliary support members 89, which are about one-third in length in comparison to the first subset of support members 77A, lie along each duct 56' being located at a radially outward-most end thereof so as not to substantially impede or alter the flow of ventilation air therealong. The auxiliary support members 89 are located at uniformly angularly spaced positions around the central axis 19 of the hopper bottom. Furthermore, the auxiliary support members 89 are of the same form as the support members 55 being inverted channels with perforated side walls.

To provide structural support for the inclined inner wall 24' in the circumferential direction 74 of the hopper bottom 10" the same includes, along each duct 56', a plurality of cross members 94A through 94C each spanning generally in the circumferential direction 74 between respective ones of an adjacent pair of the support members 77A, 77B at radially spaced positions from each other and arranged to support the inclined inner wall 24' in spaced relation to the inclined outer wall 12'. The cross members 94A-C define, together with the inclined outer wall 12', airflow control openings 97 which are sized to modulate flow of the ventilation air in the radial direction 75 along the ducts 56' so that the ventilation air flows along substantially the full length of each duct. That is, each duct 56' is constricted in cross-sectional size at select locations defined by the cross members 94A-C so as to be conducive to promoting the air to flow the full length (in the radial direction) of the duct, by momentarily accelerating the ventilation air as it passes through the respective airflow control opening 97.

Each cross member 94A, 94B or 94C is in the form of an arch having a pair of generally parallel upstanding legs 100 coupled to the inclined outer wall 12' and a generally horizontally extending portion 101 bridging therebetween and meeting each leg 100 generally at a right angle. Thus, in the illustrated arrangement, the respective airflow control opening 97 is defined by a bottom 101A of the portion 101 and inner sides 100A of the legs. A body of the cross member in the form of an arch-shaped plate is imperforate such that the ventilation air flowing transversely thereof is forced to flow through the opening 97 formed thereby of constricted size in comparison to a size of the duct 56' on either side of the cross member.

It will be appreciated that in the illustrated arrangement the legs 100 of all of the cross members 94A-94C are of a substantially common width between outer sides 100B of the legs which are connected to adjacent ones of the support members 77A, 77B and the inner sides 100A each of which defines a respective one of the airflow control openings 97. However, of course the cross members 94A to 94C differ in overall width as defined between their outer sides 100B as the radially-extending ducts 56' diverge in width in the radially outward direction 75 of the hopper bottom due to radially outward divergent relation of the support members 55 to each other. That is, along each duct 56', the cross member 94A which is located closest to the central discharge opening 21' is the most narrow for each set of cross members collectively defined by the members 94A-94C lying along a common duct 56'. Furthermore, the cross member 94C which is located furthest outwardly from the discharge opening 21' along the respective duct 56' is the widest of the set of cross members for that duct.

In each of the ducts 56' not having an inlet opening 46' in communication with the blower to admit airflow therefrom into the manifold for subsequent circulation therein, the airflow control openings 97 collectively defined by the cross members 94A-C and the inclined outer wall 12' are sized progressively smaller, with respect to a height direction between the inclined outer wall 12' and bottom edges of the cross members extending generally in the circumferential direction 74 and disposed in opposite spaced relation to the inclined outer wall, which are defined by the bottoms 101A of the portions 101, in the radially outward direction 75 along the duct. In the illustrated arrangement, the progressive reduction in height of the airflow control openings 97 is applied to all of the ducts including those with an inlet opening in communication with the blower of which there is only one.

The hopper bottom 10' comprises a single inlet opening 46' for the manifold 39' located closer to the bottom end than to the top end of the inclined inner wall 24' however more specifically this opening 46' is coincident with the closed loop path 76 that is located adjacent the bottom end 28' of the inclined inner wall 24'; this inlet opening 46' also is coincident with one of the radial ducts 56'. As such, the ventilation air flows from the blower opening 46' substantially initially in a circumferential direction generally circulating the central discharge opening 21' to reach radial ducts 56' where the ventilation air is permitted to flow radially outwardly in the direction of arrow 75. In comparison to the first arrangement of hopper bottom 10, this may provide a shorter path along which the ventilation air flows for distribution to all radial ducts 56' of the manifold, and may provide greater air pressure for subsequent flow or conveyance along each radially extending duct 56'.

The manifold 39' is substantially closed at the bottom end 28' of the inclined inner wall 24' so as to substantially restrict the ventilation air to flowing in the closed loop path 76 which is defined adjacent the inclined inner wall's bottom end 28'. In the illustrated second arrangement the manifold 39' is closed by an imperforate annular plate-like member 105 encompassing the axis 19.

The scope of the claims should not be limited by the preferred embodiments set forth in the examples but should be given the broadest interpretation consistent with the specification as a whole.

The invention claimed is:

1. A hopper bottom for supporting a cylindrical side wall of a grain bin thereon comprising:

an inclined outer wall arranged to be supported on a support surface, the inclined outer wall having an inverted cone shape so as to taper downwardly and inwardly from a top end to a bottom end of the inclined outer wall;

an inclined inner wall supported in spaced relation vertically above the inclined outer wall, the inclined inner wall having an inverted cone shape so as to taper downwardly and inwardly from a top end to a bottom end of the inclined inner wall;

the top end of the inclined inner wall or the inclined outer wall being arranged to receive the cylindrical side wall of the grain bin;

the inclined outer and inner walls being coaxial so as to enclose a common upstanding axis;

the top ends of the outer and inner inclined walls being located at a substantially common radial distance from the common upstanding axis such that the inclined inner wall at least covers an upper portion of the inclined outer wall from the top end of the inclined outer wall towards the bottom end thereof;

a manifold formed between the inclined outer and inner walls that is arranged for fluidic communication with a blower so as to receive ventilation air from the blower for release into an interior of the grain bin;

the manifold being arranged to distribute the ventilation air in a circumferential direction relative to the common upstanding axis;

the manifold spanning a full radius of the inclined inner wall so as to distribute the ventilation air in a radial direction relative to the common upstanding axis and the manifold extending in a circumferential direction of the inclined inner wall in order to distribute the ventilation air in said circumferential direction;

a plurality of ventilation openings defined in the inclined inner wall so as to communicate the manifold with the interior of the grain bin to release the ventilation air upwardly into the interior of the grain bin;

the ventilation openings being provided substantially across the full radius of the inclined inner wall from the top end to the bottom end thereof such that particulate material stored in the grain bin vertically above the inclined inner wall is ventilated by the ventilation air; and a plurality of substantially-radially extending support members disposed in the manifold and arranged to support the inclined inner wall in spaced relation to the inclined outer wall, the support members bridging between the inclined inner and outer walls and extending from the bottom end of the inclined inner wall towards the top end thereof so as to form ducts within the manifold for distributing the ventilation air in the radial direction;

wherein the manifold extends in the circumferential direction in a closed loop path encompassing the upstanding axis and the support members extend from upper ends which are coincident with the top end of the inclined inner wall relative to a radial direction thereof to lower ends of the support members located at or adjacent the bottom end of the inclined inner wall so as to locate the closed loop path adjacent the bottom end of the inclined inner wall and to form a plurality of the ducts in communication with the closed loop path.

2. The hopper bottom of claim 1 wherein the ventilation openings are provided substantially across the full circumference of the inclined inner wall.

3. The hopper bottom of claim 1 wherein the inclined inner wall spans substantially a full radius of the inclined outer wall.

4. The hopper bottom of claim 3 wherein the manifold is open below the bottom end of the inclined inner wall in the vicinity of the central discharge opening such that the ventilation air is released in a radially-inward and downward direction towards the central discharge opening.

5. The hopper bottom of claim 4 wherein there are provided openings in communication with the manifold around a full periphery of the central discharge opening of the inclined outer wall.

6. The hopper bottom of claim 1 wherein the lower ends of a first subset of the support members are spaced from the bottom end of the inclined inner wall and the lower ends of a second subset of the support members are coincident with the bottom end of the inclined inner wall, and wherein the second subset of the support members define circulation openings located along the closed annular path of the manifold which are arranged to permit the ventilation air to pass therethrough in the circumferential direction.

7. The hopper bottom of claim 1 further including a plurality of substantially-radially extending auxiliary support members each disposed intermediate respective ones of an adjacent pair of the support members relative to the circumferential direction, wherein upper ends of the auxiliary support members are located at or adjacent the top end of the inclined inner wall and lower ends of the auxiliary support members are spaced radially outwardly from the lower ends of adjacent ones of the support members.

8. The hopper bottom of claim 1 further including, along each duct, a plurality of cross members each spanning generally in the circumferential direction between respective ones of an adjacent pair of the support members at radially spaced positions from each other and arranged to support the inclined inner wall in spaced relation to the inclined outer wall, the cross members defining with the inclined outer wall airflow control openings which are sized to modulate flow of the ventilation air in the radial direction along the ducts so that the ventilation air flows along substantially the full length of each duct.

9. The hopper bottom of claim 8 wherein, in each of the ducts without an inlet opening for communicating with the blower located externally of the manifold, the airflow control openings collectively defined by the cross members and the inclined outer wall are sized progressively smaller, with respect to a height direction between the inclined outer wall and bottom edges of the cross members extending generally in the circumferential direction and disposed in opposite spaced relation to the inclined outer wall, in a radially outward direction along the duct.

10. The hopper bottom of claim 8 wherein, in each duct having an inlet opening for communicating with the blower located externally of the manifold, the airflow control openings collectively defined by the cross members and the inclined outer wall are sized progressively smaller, with respect to the height direction, in the radially outward direction along a respective one of the ducts.

11. The hopper bottom of claim 9 wherein each cross member is in the form of an arch having a pair of generally parallel upstanding legs coupled to the inclined outer wall and a generally horizontally extending portion bridging therebetween, the legs of all of the cross members being of a substantially common width between outer sides of the legs connected to adjacent ones of the support members and inner sides each defining a respective one of the airflow control openings.

12. The hopper bottom of claim 1 wherein the manifold comprises a single inlet opening which is coincident with the closed loop path for communicating the manifold with the blower located externally thereof.

13. A hopper bottom for supporting a cylindrical side wall of a grain bin thereon comprising:
- an inclined outer wall arranged to be supported on a support surface, the inclined outer wall having an inverted cone shape so as to taper downwardly and inwardly from a top end to a bottom end of the inclined outer wall;
- an inclined inner wall supported in spaced relation vertically above the inclined outer wall, the inclined inner wall having an inverted cone shape so as to taper downwardly and inwardly from a top end to a bottom end of the inclined inner wall;
- the top end of the inclined inner wall or the inclined outer wall being arranged to receive the cylindrical side wall of the grain bin;
- the inclined outer and inner walls being coaxial so as to enclose a common upstanding axis;
- the top ends of the outer and inner inclined walls being located at a substantially common radial distance from the common upstanding axis such that the inclined inner wall at least covers an upper portion of the inclined outer wall from the top end of the inclined outer wall towards the bottom end thereof;
- a manifold formed between the inclined outer and inner walls that is arranged for fluidic communication with a blower so as to receive ventilation air from the blower for release into an interior of the grain bin;
- the manifold being arranged to distribute the ventilation air in a circumferential direction relative to the common upstanding axis;
- the manifold spanning a full radius of the inclined inner wall so as to distribute the ventilation air in a radial direction relative to the common upstanding axis; and
- a plurality of ventilation openings defined in the inclined inner wall so as to communicate the manifold with the interior of the grain bin to release the ventilation air upwardly into the interior of the grain bin;
- the ventilation openings being provided substantially across the full radius of the inclined inner wall from the top end to the bottom end thereof such that particulate material stored in the grain bin vertically above the inclined inner wall is ventilated by the ventilation air;
- wherein the bottom end of the inclined outer wall defines a central discharge opening for gravity discharge of the particulate material stored in the grain bin, the bottom end of the inclined inner wall being recessed radially outwardly from the common upstanding axis relative to the central discharge opening at the bottom end of the inclined outer wall so as to form between the bottom end of the inclined inner wall and the central discharge opening a discharge chute which has an inverted cone shape between an upper end of the discharge chute defined by the bottom end of the inclined inner wall and a lower end of the discharge chute defined by the central discharge opening at the bottom end of the inclined outer wall.

14. A hopper bottom for supporting a cylindrical side wall of a grain bin thereon comprising:
- an inclined outer wall arranged to be supported on a support surface, the inclined outer wall having an inverted cone shape so as to taper downwardly and inwardly from a top end to a bottom end of the inclined outer wall;
- an inclined inner wall supported in spaced relation vertically above the inclined outer wall, the inclined inner wall having an inverted cone shape so as to taper downwardly and inwardly from a top end to a bottom end of the inclined inner wall;
- the top end of the inclined inner wall or the inclined outer wall being arranged to receive the cylindrical side wall of the grain bin;
- the inclined outer and inner walls being coaxial so as to enclose a common upstanding axis;
- the top ends of the outer and inner inclined walls being located at a substantially common radial distance from the common upstanding axis such that the inclined inner wall at least covers an upper portion of the inclined outer wall from the top end of the inclined outer wall towards the bottom end thereof;
- a manifold formed between the inclined outer and inner walls that is arranged for fluidic communication with a blower so as to receive ventilation air from the blower for release into an interior of the grain bin;
- the manifold being arranged to distribute the ventilation air in a circumferential direction relative to the common upstanding axis;
- the manifold spanning a full radius of the inclined inner wall so as to distribute the ventilation air in a radial direction relative to the common upstanding axis and the manifold extending in a circumferential direction of the inclined inner wall in order to distribute the ventilation air in said circumferential direction;
- a plurality of ventilation openings defined in the inclined inner wall so as to communicate the manifold with the interior of the grain bin to release the ventilation air upwardly into the interior of the grain bin;
- the ventilation openings being provided substantially across the full radius of the inclined inner wall from the top end to the bottom end thereof such that particulate material stored in the grain bin vertically above the inclined inner wall is ventilated by the ventilation air;
- a plurality of substantially-radially extending support members disposed in the manifold and arranged to support the inclined inner wall in spaced relation to the inclined outer wall, the support members bridging between the inclined inner and outer walls and extending from the bottom end of the inclined inner wall towards the top end thereof so as to form ducts within the manifold for distributing the ventilation air in the radial direction;
- wherein the manifold spans a full circumference of the inclined inner wall and the support members extend from lower ends which are coincident with the bottom end of the inclined inner wall relative to a radial direction thereof to upper ends of the support members which are spaced from the top end of the inclined inner wall such that the manifold comprises an annular upper portion adjacent the top end of the inclined inner wall and a plurality of the ducts in communication with the annular upper portion.

* * * * *